United States Patent [19]

Fakler

[11] Patent Number: 5,543,677
[45] Date of Patent: Aug. 6, 1996

[54] SLIPRING-LESS CLAW-POLE GENERATOR

[75] Inventor: Bernhard Fakler, Esslingen, Germany

[73] Assignee: Robert Bosch GmbH, Stuttgart, Germany

[21] Appl. No.: 308,615

[22] Filed: Sep. 19, 1994

Related U.S. Application Data

[63] Continuation of Ser. No. 119,600, Sep. 10, 1993, abandoned, which is a continuation of Ser. No. 728,302, Jul. 5, 1991, abandoned, which is a continuation of Ser. No. 495,356, Mar. 16, 1990, abandoned.

[30] Foreign Application Priority Data

May 27, 1989 [DE] Germany ............... 39 17 343.7

[51] Int. Cl.⁶ .................................................. H02K 1/22
[52] U.S. Cl. ........................... 310/263; 310/179; 310/254; 310/266
[58] Field of Search .................................. 310/263, 266, 310/258, 179, 180, 105, 68 D, 91, 42

[56] References Cited

U.S. PATENT DOCUMENTS

| | | | |
|---|---|---|---|
| 3,283,188 | 11/1966 | Edick | 310/179 |
| 3,953,753 | 4/1976 | Barrett | 310/168 |
| 4,358,695 | 11/1982 | MacDonald | 310/105 |
| 4,611,139 | 9/1986 | Godkin | 310/263 |
| 4,683,392 | 7/1987 | MacDonald | 310/105 |
| 4,949,000 | 8/1990 | Petersen | 310/179 |
| 4,952,828 | 8/1990 | Yu-Fang | 310/680 |
| 4,980,588 | 12/1990 | Ogawa | 310/680 |

FOREIGN PATENT DOCUMENTS

| | | | |
|---|---|---|---|
| 1193589 | 5/1965 | Germany | 310/263 |
| 0386547 | 4/1965 | Sweden | 310/263 |
| 1260406 | 1/1972 | United Kingdom . | |
| 2148611 | 5/1985 | United Kingdom . | |

OTHER PUBLICATIONS

Principles, of Alternating–Current Machinery by R. R. Lawrence, (No Month) 1940, McGraw–Hill Bk. Co., New York, London, pp. 59, 54, 55.
Bosch Alternators–Technical Instruction, (No Month) 1985, Germany.
Robert Bosch GmbH *Automotive Handbook* 2nd English Ed. 19th German Ed. Sep. 1986, pp. 49, 430–433.

*Primary Examiner*—R. Skudy
*Attorney, Agent, or Firm*—Frishauf, Holtz, Goodman, Langer & Chick, P.C.

[57] ABSTRACT

In a slipring-less generator having magnetic coupling rotors embodied in claw pole fashion, it is proposed that the two additional air gaps, which are embodied by annular magnetic flux guide elements, are extended obliquely at an angle to the longitudinal axis of the generator and extend at least in part above or below the field winding, so that with a corresponding enlargement of the further two air gaps present in addition to the working air gap and a resultant reduction of magnetic voltage in these air gaps, either higher power or a shorter structural length with a corresponding weight reduction is obtained.

12 Claims, 4 Drawing Sheets

SLIPRING-LESS CLAW-POLE GENERATOR

This application is a continuation of application Ser. No. 08/119,600, filed Sep. 10, 1993, now abandoned, which in turn was a continuation of Ser. No. 07/728,302, filed Jul. 5, 1991, now abandoned, which in turn was a continuation of Ser. No. 07/495,356, filed Mar. 16, 1990, now abandoned.

FIELD OF THE INVENTION

The invention relates to a slipring-less claw pole alternator.

BACKGROUND

Many versions of such claw pole generators are known which provide alternating current output and are referred to as alternators; the so-called magnetic coupling rotor generators, to which the invention relates in particular, represent a special type of claw pole generators, in which only the claw poles rotate, while the excitation winding and annular magnetic flux guide elements remains stationary. In a known magnetic coupling rotor generator of this type (Bosch Automotive Handbook, published by Robert Bosch GmbH, Stuttgart, Sept. 1986, pp. 430–431), generator is described in which the excitation winding is supplied with current directly by the rectifier via the regulator, since because of the stationary excitation winding, sliprings and slip-ring contacts are not required. This gives the generator a longer service life but has the disadvantage of greater weight by comparison with claw pole generators of equal power, because the magnetic flux has to bridge two further air gaps in addition to the working air gap. Besides the increased weight, the structural length is greater and the excitation requirement higher, at comparable power; or if the magnetic coupling rotor generators have the same dimensions as other claw pole generators, then less power is produced. In experimental attempts at shortening the structural length in known magnetic coupling rotor generators by shortening the additional air gaps, there was an even higher requirement for excitation current, yet no success at actually overcoming the problem.

THE INVENTION

It is therefore the object of the present invention to provide a substantial increase in power in a slipring-less magnetic coupling rotor generator without requiring an increase in the structural length, weight or excitation requirement, or—which is the same thing—to enable a decisive reduction in structural length with substantially unchanged power.

Briefly the additional air caps are formed in a conical or stairstep shape. These gaps can be extended past the space between the field winding and the drive side face end, or beyond the field winding, which is equivalent to dimensioning the air gap areas more generously. This means a lower excitation requirement or greater power, with a considerable reduction in structural length, by up to 25%, for instance, compared with conventional slipring-less generators, and a simultaneous associated reduction in the weight of the magnet system and hence of the total generator weight.

Another advantage is that by shifting part of the additional air gaps spatially above and below the field winding, the plate thickness of the field winding carrier can now be dimensioned with a view to other aspects, namely the possible magnetic induction in the iron, and less with a view to air gap induction; once again, this has advantages in terms of the area of the air gaps.

A particularly advantageous feature of the invention is the embodiment of the additional, now substantially longer air gaps with a stairstep course; this simplifies manufacture, because only cylindrical and plane surfaces then need to be machined, and also because in that case the unavoidable tolerances in length do not extend into the air gap width but instead remain between the plane surfaces without influencing the width of the active air gaps.

It is another advantage when the stator center is located nearer the back side, that the mechanically weaker magnetic flux guide element on the drive side can be embodied with greater strength and is spaced sufficiently apart from the pole projection tips of the magnetic flux guide element on the back side to avoid unnecessary stray flux.

Another advantage in a preferred embodiment is that the outer additional air gap can be formed as a labyrinth, with opposed cylindrical faces forming the active air gap. With this kind of labyrinthine embodiment, the drive-side magnetic flux guide element can be moved away from possible overlap with the field winding, so that the field winding carrier can be turned in one piece on a lathe, and this outer additional air gap is formed by the mutually complementary labyrinthine shapes of the field winding carrier, which is drawn upward toward the outside in this region, and the drive-side claw bases of the rotor.

DRAWINGS

Various exemplary embodiments of the invention are shown in the drawings and are described in further detail below.

FIG. 1 is a detailed sectional view of one possible embodiment of a slipring-less claw pole generator according to the invention; FIG. 1A shows the conventional model according to the prior art, while

DETAILED DESCRIPTION

In a slipring-less generator having magnetic coupling rotors, which is a special form of a claw pole generator, the basic concept of the present invention, is to remove the two additional air gaps, required in addition to the working air gap, from their former position in the space between the field winding and one end (the drive-side end) of the three-phase generator and shift them to above and below the field winding, and at the same time, given the resultant oblique position with respect to the longitudinal axis of the generator, to form the air gaps with a conical or stairstep course.

Figure 1A:
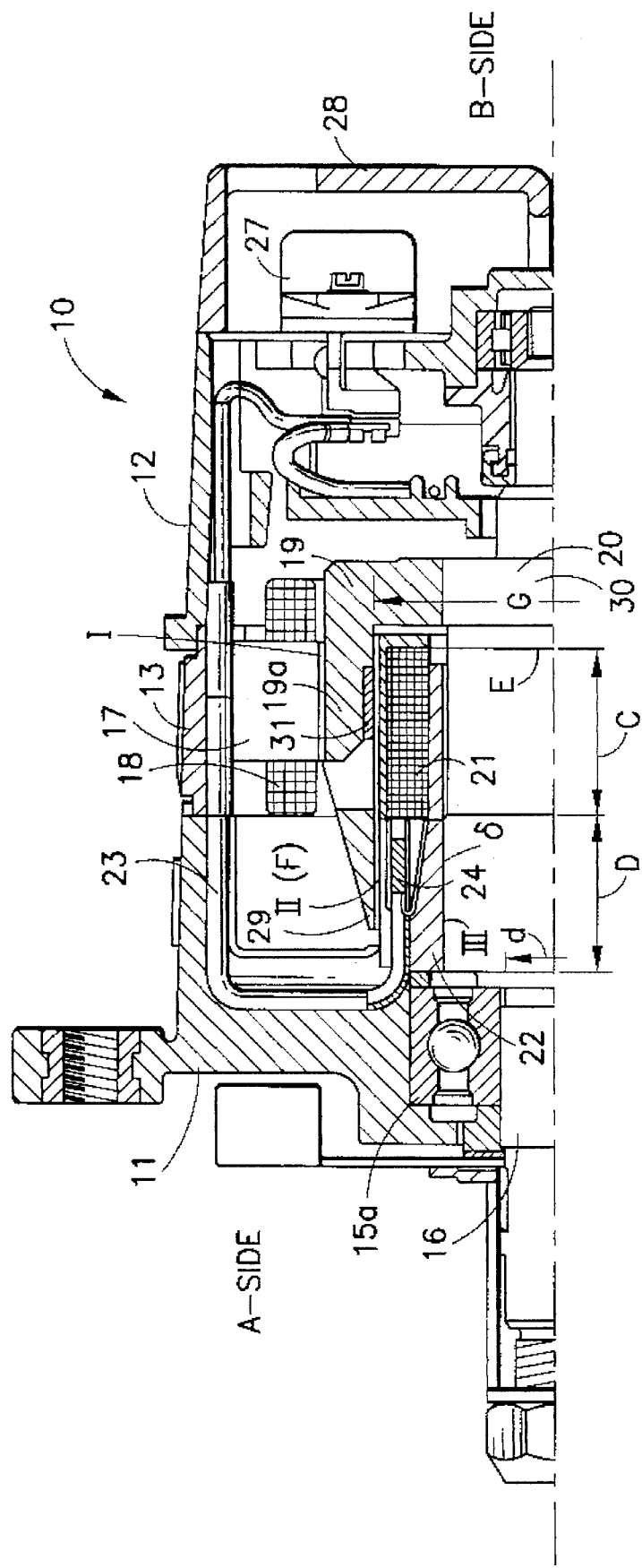

The ensuing description in conjunction with FIG. 1A will first discuss the basic and in that respect known structure of a magnetic rotor coupling generator, because the essential advantages, in terms of improving the power output and/or weight reduction and/or shortening of the structural length, can be persuasively demonstrated only by making suitable comparisons with magnetic coupling rotor generators according to the prior art.

The magnetic coupling rotor generator 10 of FIG. 1A includes an A frame 11 and a B frame 12; in the nomenclature selected here, the A frame (located on the A side) is the drive-side frame, while the B frame is the frame on the brush holder side or B side. In the embodiment of a three-phase generator shown here, this naturally does not apply, in the sense that it is a slipring-less system. Nevertheless, the terms will be retained for the sake of better comprehension. Both frames 11 and 12 are joined via an intermediate ring 13, with adaptors oriented toward one another and with clamping screws 14 (FIG. 1B) joining the two housing parts or frames A and B to one another. In this example, the field winding carrier is mounted on the drive-side, or A frame 11. Naturally it is equally possible to secure the field winding carrier on the B side, with the A- and B-sides changing places on the inside.

The A frame 11 and B frame 12 are preferably cup-shaped and receive the bearings 14 and 15 on both sides for the magnetic coupling rotor shaft 16. The stator assembly 17 with the typically three-phase stator winding 18 is retained by the intermediate rings 13 as shown in FIG. 1A, for instance with a press fit. Together with the claw poles of the magnetic coupling rotor, the stator assembly forms a first, or working air gap I; the magnetic coupling rotor 19 and shaft 16 forming a rotating system, are the only rotating parts of the three-phase generator. Since a magnetic coupling rotor generator 15 is a special form of claw pole generator, the magnetic coupling rotor 19 here again includes poles 19a, 19b that mesh with one another in the form of claws and are formed so as to produce the action of an alternating magnetic flux upon the stationary stator winding 18. One of the pole halves of the magnetic coupling rotor 19, in this case on the back or B side, is cup shaped and either has a bottom 20 forming a hub, or a press fit, by which the magnetic coupling rotor 19 is secured to the shaft 16 carrying it.

Figure 1B:
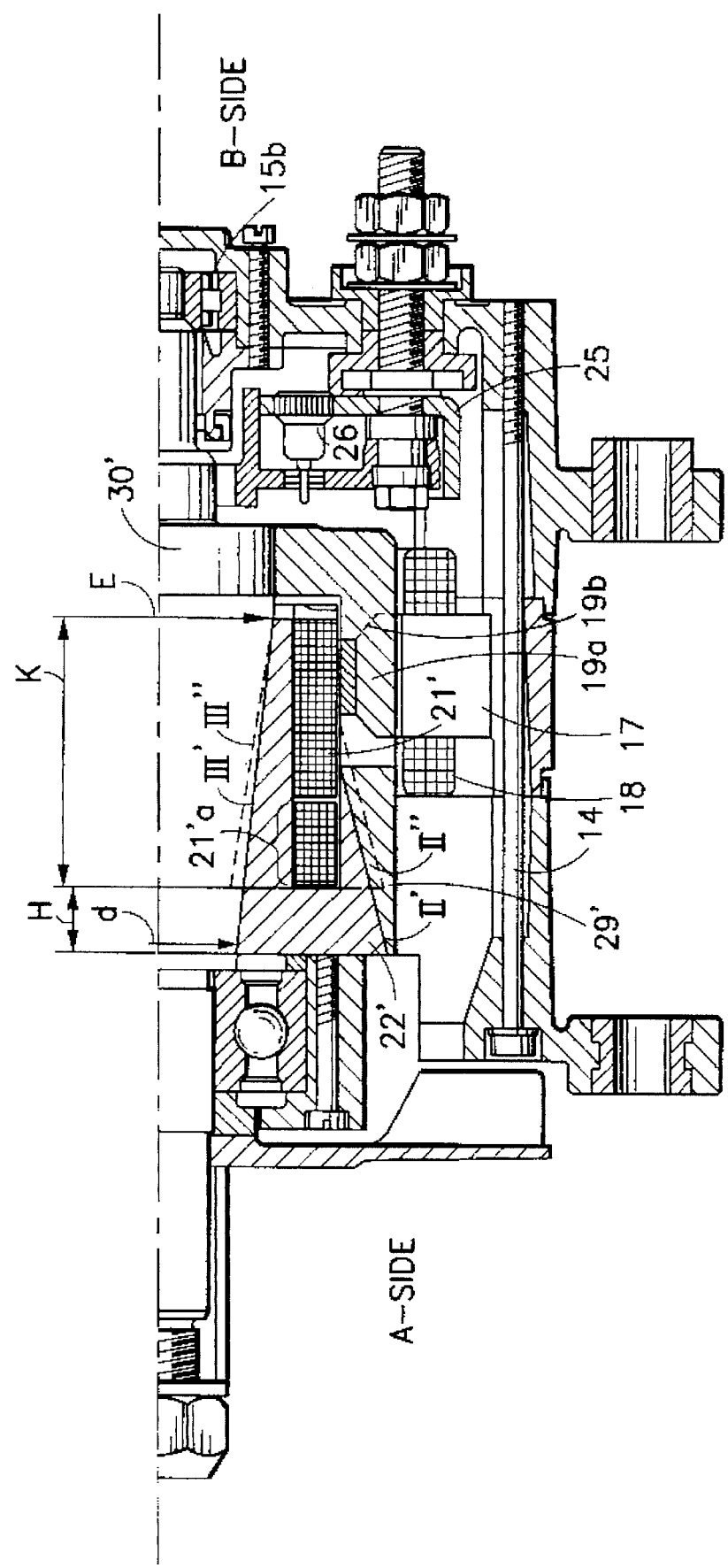
FIG. 1B is designed in accordance with the basic principles of the present invention.

For easier comprehension, the claws of rotor 19 on the back or B side, which thus have their claw bases on the back side, are shown at 19a; in FIG. 1B they are shown in solid lines, while the claws on the drive side in the vicinity of the stator bore are merely represented by the dashed line 19b. These claws 19 are coupled to a non-magnetic ring 31 which mechanically connects claws 19a and 19b. The field winding coil is shown at 21. It is stationary, and supported by a field winding carrier 22 secured to the A frame 11; in the sectional view of FIG. 1A, the electrical supply line 23 for supplying the field winding and the connection region 24 are also shown.

A rectifier diode carrier plate 25 (FIG. 1B) is secured to the B frame, and a rectifier diode is shown at 26; the regulator 27 is located inside its own housing cup 28 that protects it. This basic structure, known thus far, of a magnetic coupling rotor generator need not be described further here; reference can be made to the aforementioned Bosch Automotive Handbook, pages 430 and 431.

In FIG. 1A the two further air gaps required are shown at II and III; the second, or outer air gap II is located between a magnetic flux guide element 29 on the drive side, rotating with the rotor, and the facing surface of the field winding carrier 22; the third, or inner air gap III having a gap width δ, is located between the same field winding carrier 22 and a hub-shaped part of the back, or B-side magnetic flux guide element 30, or of shaft 16. In other words, the two further air gaps II and III are located radially opposite one another. In this initially described structure here, which is part of the prior art, the magnetically active region extends from the drive-side end only as far as the point at which the field winding 21 begins on the field winding carrier 22, because in the region marked C the field winding carrier has the form of a thin tube that cannot carry any significant magnetic flux in the axial direction. Accordingly all the magnetic flux must bridge the air gaps in region D. Between the field winding 21 and the facing inner claw ring surfaces, there is also a nonmagnetic ring 31, which mechanically connects the claws 19a and 19b. The regions C, D have the dimension shown by the respective dimension arrows; E is the diameter of the air gap III at the larger side, d at the smaller diameter side, and δ the width of air gap III; F and G are the length and diameter, respectively, of air gap II.

The invention decreases or eliminates the problems of structural length, weight and excitation requirement at reduced power that are due to the two further air gaps, by lengthening these air gaps; at least for the third, or inner air gap III this means that it assumes a conical or steplike shape, so that it now extends generally obliquely to the longitudinal axis of the generator and is indicated by reference numeral III' in FIG. 1B. In the same way, the second, or outer air gap II can made oblique to the generator longitudinal axis by shaping it conically, and is therefore shown in FIG. 1B at II'. A further essential characteristic is that these two air gaps II and III no longer need to rely on the space between the field winding 21 and the drive-side end, see dimension D, FIG. 1A; instead, they can now be moved above and below the field winding 21, given a suitable change in shape of the field winding carrier, shown at 22' in FIG. 1B, and given correspondingly adapted complementary changes to the drive-side magnetic flux guide element 29' or back magnetic flux guide element 30'.

Because of the conical shape of the air gaps II' and III', both radially inwardly of air gap I, now extending at an angle to the longitudinal axis of the generator, these gaps II' and III' can now be made longer or can be active over a longer length; if initially the assumption is that the length of the generator system is unchanged, then a considerable increase in the field winding in the axial direction is attained, because this winding, identified by reference numeral 21' in FIG. 1B, can be increased by an axial longitudinal part 21a' and extends into the field winding carrier 22', which becomes markedly thicker in its annular dimensions toward the drive side.

This change in shape of the two further air gaps in accordance with the first embodiment shown in FIG. 1 having air gaps II' and III' engenders two different options; that is, either an up to 25% shorter structural length and a correspondingly lower weight of the magnet system is given preference, with a substantially unchanged power; or the invention is used to increase the power, with the conical configuration of the air gaps.

The invention can now be studied from the standpoint of structural length reduction with the dimensions of the field coil, the magnetic potential and the magnetic flux remaining unchanged from the prior art.

The additional axial portion 21a' of the field coil is omitted, and a new possible configuration of this kind of magnetic coupling rotor generator is obtained, having a savings, indicated by the letter H in FIG. 1B, in terms of reduced structural length, so that the length of the air gap cone is now merely K. The shape and course of the air gaps obtained in this case (with reduced structural length) are merely suggested in FIG. 1B with dashed lines and are marked with reference symbols II" and III".

Figure 2:
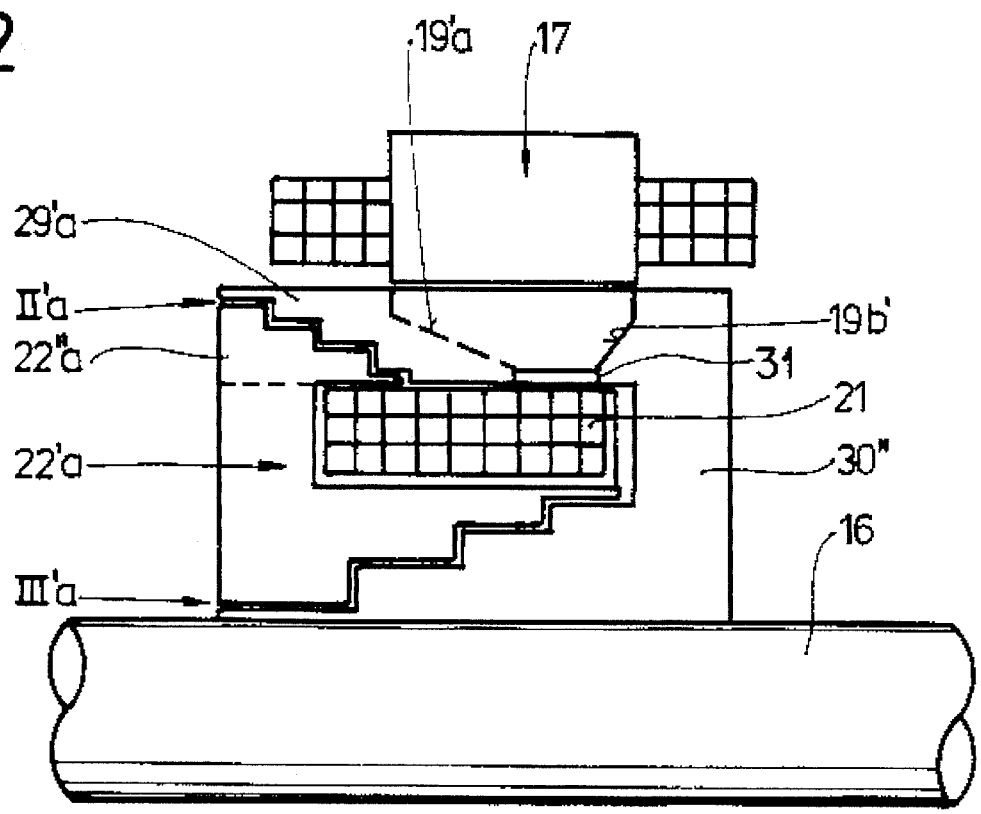
FIG. 2 is a highly schematically shown detail of one possible further embodiment of a stairstep-type air gap design.

Comparison data between alternators of the prior art and of the present invention persuasively show the decisive advantages and improvements that can be attained by the embodiment and change in position according to the invention of the additional two air gaps II and III in a magnetic coupling rotor generator. By using the invention, the maximum load current of such a generator, which is now approximately 55 A, is increased so that the rated current can be raised from 50 A to 65 A with the same stator winding design. Alternatively, and for the same electrical output as a prior art generator, a reduction in the structural length by 17 mm, resulting in a saving of approximately 65 kg in weight, is obtained. It is considered particularly advantageous that by shifting part of the air gaps to below and above the region of the field winding, the option now exists of designing the plate thickness of the field winding carrier 22' only with a view to the possible magnetic induction in the iron, rather than with a view to the air gap induction. The plate thickness can therefore be made equal to the plate thickness of the back magnetic flux guide element 30, for instance, which makes it possible, as already noted, to dimension the air gap areas more generously. If the conical design of the air gaps II', III' or II", III" of FIG. 1B, despite the magnetic advantages that it makes possible, is considered to be problematic both in terms of manufacture and in terms of its assembly and the resultant relative nature of the air gap thickness because of axial manufacturing tolerances, then it is readily possible, as shown in FIG. 2, for the conical surfaces of the air gaps already described to be approximated by providing stairstep-like air gaps, having also the advantages of which have been discussed at length. This only slightly changes the magnetically active air gap area; but it results in easily machined cylindrical and plane, or radial surfaces. The cylindrical surfaces form the active air gaps, as can be readily appreciated, and the tolerances in length between the plane surfaces can be absorbed without affecting the width of the active air gaps.

Figure 3:
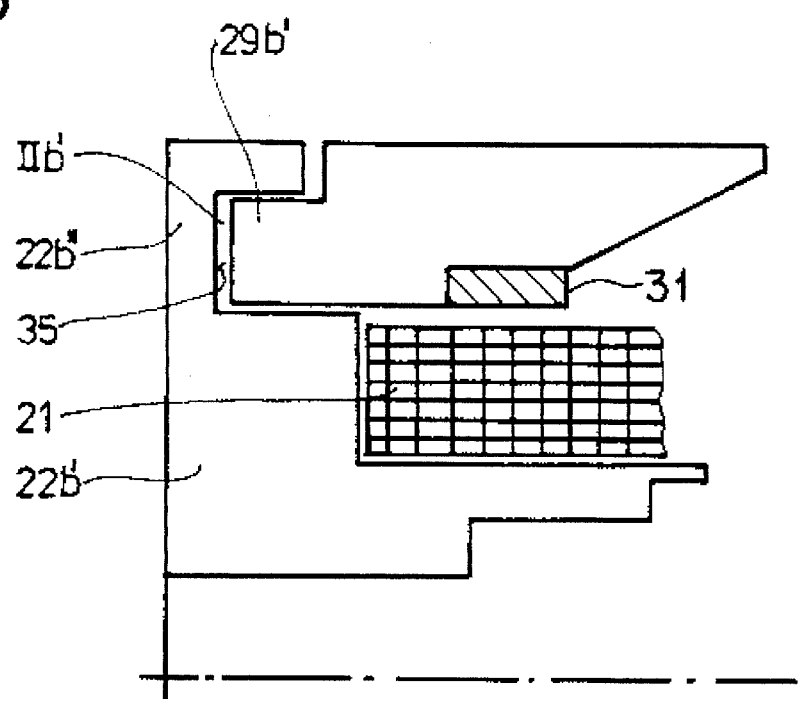
FIGS. 3–5 are also schematically shown details, showing external air gap shapes that enable one-piece manufacture of the field winding carrier and problem-free winding of it.
Figure 4:
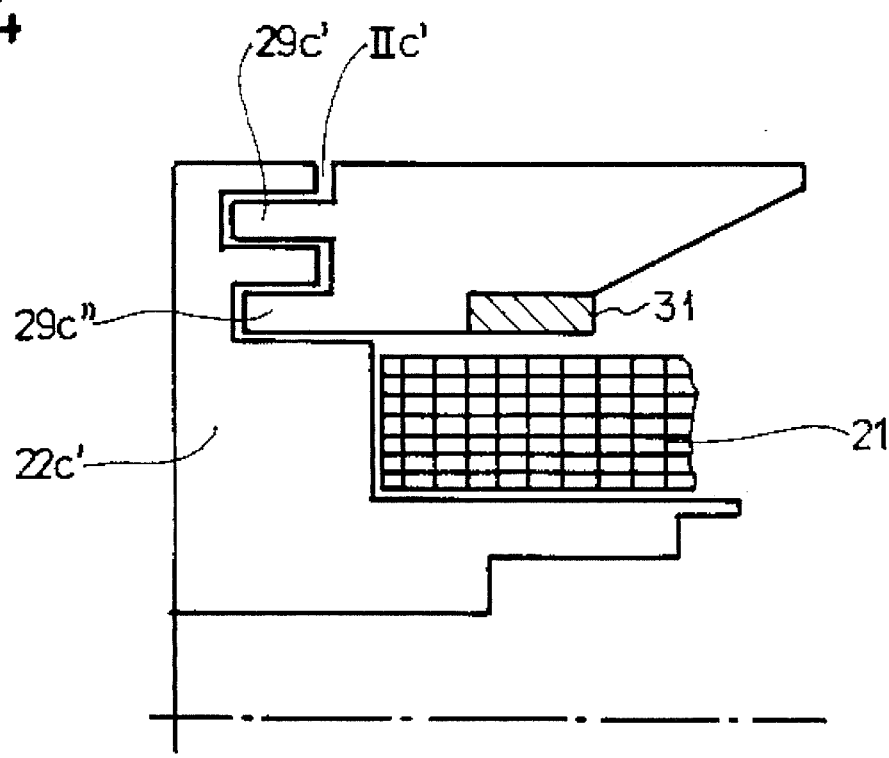
Figure 5:
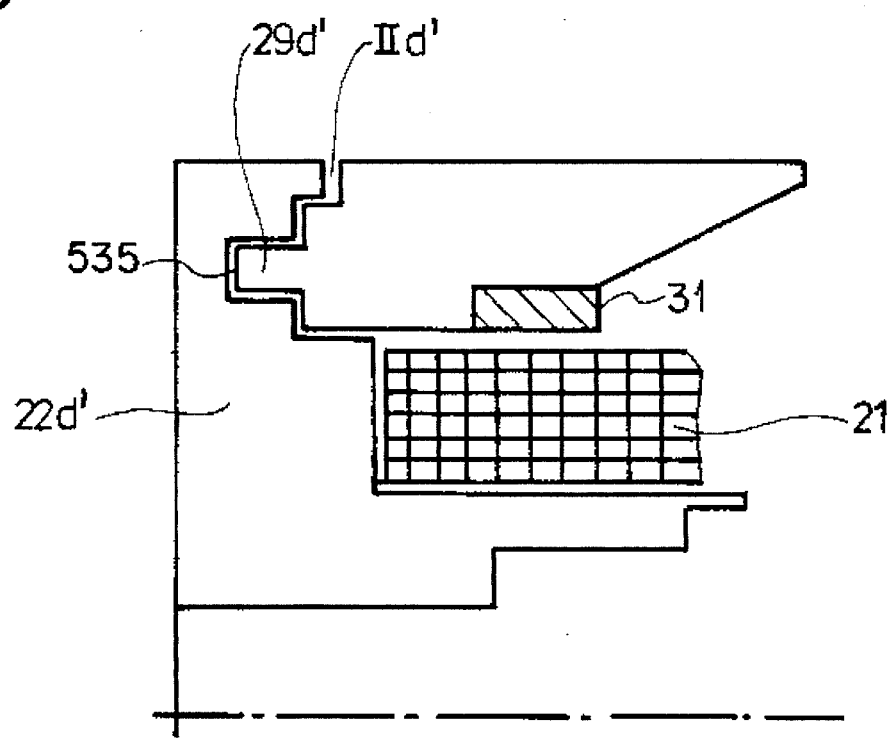

In the highly schematic fragmentary illustration of FIG. 2, as in the following FIGS. 3, 4 and 5, similar structural elements are identified by the same reference numerals with prime notations, if they are not identical. The B-side magnetic flux guide element 30' on the back or B side is mounted on the rotor shaft, extending in hublike fashion about the field winding 21 and merging, in the region adjoining the stator assembly 17, with the claw poles 19a'; the magnetic flux guide element 29a' on the drive side, is a correspondingly complementarily stepped root of the claw pole 19' for the drive-side claw. In FIGS. 3, 4 and 5, the magnetic flux guide element 30" has been omitted from the drawings for clarity.

The shape and embodiment of the individual steps in the stairstep course of the two air gaps, namely the inner air gap IIIa' and outer air gap IIa', is intrinsically arbitrary; however, an approximately equal distribution of flux should be provided for in dimensioning the steps. The steps take the generally oblique course of the air gaps II' and III' of the exemplary embodiment of FIG. 1B; once again, the design can be directed either to higher power, or a shorter structural length and with substantially equal power. In this process the angles that the conical surfaces of the air gaps form with the longitudinal axis of the generator vary slightly.

As shown in FIG. 2, the greatly modified field winding carrier 22a' can either be made undivided, in which case because of the fact that an upper part 22a", which has the stepped annular shape on its outside surface, partly fits over the field winding 21, the field coil is logically wound beforehand and then inserted into the receptacle region embodied by the field coil carrier 22a'. Alternatively, however, the field winding 21 can also be wound onto the field winding carrier 22a'; in that case the upper part 22a", as suggested by the dashed parting line, can be manufactured separately, and then, after the winding of the field coil, fitted, since it is of annular shape, by a shrink fit or press fit onto the basic shape of the field winding carrier 22a'.

In this connection it is advantageous to shift the stator center nearer the back, because then the magnetic flux guide element 29a' on the drive side, which is mechanically weakened by the conical or stepped air gap II, can be made with greater strength and is spaced apart sufficiently from the pole projection tips of the magnetic flux guide element 30' on the back, to avoid unnecessary stray flux.

Further advantageous modification are possible in the region of the outer additional air gap II' or II'a; in this way a considerable reduction in expense is attainable without having to lose the basic advantages. As shown in FIGS. 3, 4 and 5, for instance, it may be useful to embody the outer air gap course in the general form of a labyrinth, with cylindrical spaces separating the parts and forming the active air gap.

A first embodiment of this kind of labyrinth air gap, IIb' is shown in FIG. 3. In this embodiment, the labyrinth is reduced to an annular groove 35 in the upper region 22b" of the field winding carrier 22b'. This annular groove 35 surrounds the drive-side claw roots of the rotor, which in this case form the drive-side magnetic flux guide element 29b'.

The labyrinthine embodiment of the outer air gap IIc' can also be achieved in the form of double annular grooves, as shown in FIG. 4; once again, suitable complementarily formed protrusions 29c', 29c" of the drive-side claw roots, as the magnetic flux guide element on this end, engage the double annular groove formed by the upper part of the field winding carrier 22c'.

Finally, as shown in FIG. 5, it is possible for the groove 535 to be in stepped form on both sides, resulting in a meandering outer air gap IId'. The flux guide element 29d' and the field winding carrier 22d' will have the matching stepped facing surfaces shown in FIG. 5 separated by the air gap IId'. This groove 535 may also be formed to be cone-shaped.

A common feature of all these exemplary embodiments of FIGS. 3, 4 and 5 is that the arbitrarily labyrinthine air gap configuration is recessed toward the drive side of the generator to behind the field winding carrier, so that it is possible without difficulty to manufacture the field winding carrier in one piece in the usual manner, or in other words to turn it in one piece on a lathe, and nevertheless to wind the field winding directly onto the field winding carrier.

Various changes and modifications may be made, and features described in connection one of the embodiments may be used with any of the others, within the scope of the inventive concept.

I claim:

1. A slipring-less three-phase alternator for mobile vehicular application, said alternator defining a drive side (A) and a remote side (B), said alternator defining a longitudinal axis of rotation and having a stator assembly (17) with a three-phase stator winding (18), a rotor shaft (16) oriented along the longitudinal axis of said alternator, a magnetic coupling rotor (19) formed as a generally cup-shaped claw pole rotor having a remote side flux guide element (30) formed with a bottom plate (20), which is secured to the rotor shaft to couple the rotor (19) to the shaft (16) for rotation with the rotor shaft (16) to form, with the shaft, a magnetic flux carrying rotating system, claw poles (19a) axially projecting from the remote side flux guide element (30), a drive side flux guide element (29), further claw poles (19b) axially projecting from the drive side flux guide element (29), a stationary field winding (21), a stationary field winding carrier (22) forming an inner pole on which said stationary field winding is located, said field winding carrier (22) extending inwardly within said cup-shaped rotor (19), three air gaps between said rotating system (16, 19), said stator assembly (17) and said field winding carrier (22), respectively, wherein a first or working air gap (I) is located between said stator assembly (17) and radially outer surfaces of said claw poles (19a, 19b) of said claw-pole rotor (19) of said rotating system;

a second or outer air gap (II) is located between said stationary field winding carrier (22) and opposite, radially inner surfaces of said claw-pole rotor (19); and a third or inner air gap (III) is located between said stationary field winding carrier (22) and said rotating, magnetic flux carrying system, said second or outer air gap (II) being positioned radially inwardly of the first, or working air gap (I) and radially outwardly of the third, or inner air gap (III), wherein both said field winding carrier (22) and said flux guide elements (29, 30) are shaped and configured such that the second or outer air gap (II', II", IIa', IIb', IIc') extends in an oblique direction with respect to the longitudinal axis of the alternator and has a cross-sectional shape selected from the group consisting of a conical shape, and a stair step shape, and the third, or inner air gap (III', III") extends in an oblique direction with respect to the longitudinal axis of the alternator and has a cross-sectional shape selected from the group consisting of a conical shape, and a stair-step shape; and wherein said second or outer air gap and third, or inner air gap are located at least in part over and in radial alignment with the field winding (21) on the field winding carrier (22) and extend axially beyond the field winding (21) at a side thereof adjacent to the drive side of the alternator;

wherein at least the third or inner air gap (III', III") extends magnetically actively to an end portion of the field winding (21, 21') closest to said remote side; and wherein both the second or outer air gap, and the third or inner air gap are defined by complementarily shaped portions extending in said oblique direction of radially inner surfaces of said claw-pole rotor, said radially outer surfaces of said magnetic flux carrying system, add the field winding carrier (22).

2. The alternator of claim 1, wherein the second or outer air gap extends over only part of the field winding carrier (22).

3. The alternator of claim 1, wherein the shape of the field winding carrier (22', 22a', 22b', 22c', 22d') is annular and becomes increasingly thicker towards the drive-side region; and wherein the shape of the magnetic coupling rotor hub secured on the rotor shaft (16) of said alternator is generally frustoconical and complementary to the increasingly thicker regions of the annual field winding carrier (22), whereby said inner and outer air gaps located between said field winding carrier (22) and the magnetic coupling rotor gap will extend in said oblique direction, and result in a short axial length of said alternator.

4. The alternator of claim 1, wherein said second, or outer, as well as said third, or inner, air gaps are of stair-step shape, and include plane, radial surfaces.

5. The alternator of claim 1, wherein said drive side flux guide elements and remote side flux guide elements are bodies of rotation and include, at least in part, said claw poles of said rotor (19) as a unitary, composite magnetic structure.

6. The alternator of claim 1, wherein the field winding carrier comprises a two-part structure having an upper part and a main part, said upper part and main part defining a recess therebetween, said recess receiving said field winding (21); and wherein said upper part (22a") is joined to the main part (22a') by a press fit.

7. The alternator of claim 1, wherein the field winding carrier is formed with an annular recess or receptacle region into which said field winding extends;

wherein said second or outer air gap is of stair-step configuration and located at least in part in radial alignment with said recess or receptacle region; and wherein said third or inner gap is of stair-step configuration and located at least in part in radial alignment with said field winding carrier.

8. A slipring-less three-phase alternator for mobile vehicular application, said alternator defining a drive side (A) and a remote side (B), said alternator defining a longitudinal axis of rotation and having a stator assembly (17) with a three-phase stator winding (18), a rotor shaft (16) oriented along the longitudinal axis of said alternator, a magnetic coupling rotor (19) formed as a generally cup-shaped claw pole rotor having a remote side flux guide element (30) formed with a bottom plate (20), which is secured to the rotor shaft to couple the rotor (19) to the shaft (16) for rotation with the rotor shaft (16) to form, with the shaft, a magnetic flux carrying rotating system, claw poles (19a) axially projecting from the remote side flux guide element (30), a drive side flux guide element (29), further claw poles (19b) axially projecting from the drive side flux guide element (29), a stationary field winding (21), a stationary field winding carrier (22) forming an inner pole on which said stationary field winding is located, said field winding carrier (22) extending inwardly within said cup-shaped rotor (19), three air gaps between said rotating system (16, 19), said stator assembly (17) and said field winding carrier (22), respectively, wherein a first or working air gap (I) is located between said stator assembly (17) and radially outer surfaces of said claw poles (19a, 19b) of said claw-pole rotor (19) of said rotating system;

a second or outer air gap (II) is located between said stationary field winding carrier (22) and opposite, radially inner surfaces of said claw-pole rotor (19); and a third or inner air gap (III) is located between said stationary field winding carrier (22) and said rotating, magnetic flux carrying system, said second or outer air gap (II) being positioned radially inwardly of the first, or working air gap (I) and radially outwardly of the third, or inner air gap (III), wherein both said field winding carrier (22) and said flux guide elements (29, 30) are shaped and configured such that the second or outer air gap is of labyrinth shape and formed by an annular groove in the field winding carrier, into which an annular protrusion of the drive side flux guide element extends, and the third, or inner air gap extends in an oblique direction with respect to the longitudinal axis of the alternator and has a cross-sectional shape selected from the group consisting of a conical shape, and a stair-step shape; and wherein said second or outer air gap extends axially beyond the field winding (21) at a side thereof adjacent to the drive side of the alternator;

wherein both said second or outer gap and said third or inner air gap are defined by complementarily shaped portions of radially inner surfaces of said claw-pole rotor, radially outer surfaces of said magnetic flux carrying system, and the field winding carrier; and wherein at least the third or inner air gap extends magnetically actively to an end portion of the field winding (21, 21') closest to said remote side.

9. The alternator of claim 8, wherein the second or outer air gap extends over only part of the field winding carrier (22).

10. The alternator of claim 8, wherein the second or outer air gap of labyrinthine shape has an air gap portion which is formed by a double groove-and-protrusion arrangement.

11. The alternator of claim 8, wherein said third, or inner, air gap is of stair-step shape, and includes plane, radial surfaces.

12. The alternator of claim 8, wherein said annular protrusion of the drive side flux guide element is, in cross section, stair-step-shaped;

the annular groove in the field winding carrier, in cross section, is stair-step-shaped complementary to said stair-step shape of said annular protrusion of the drive side flux guide element; and the second or outer air gap is delimited by the drive side flux guide element and by said stationary field winding carrier (22) in said stair-step shape.

* * * * *